US 6,675,570 B2
Jan. 13, 2004

(12) United States Patent
Herbison et al.

(54) LOW-COST GENERAL AVIATION FUEL CONTROL SYSTEM

(75) Inventors: Timothy A. Herbison, Lyndhurst, OH (US); Martin A. Clements, North Royalton, OH (US); Robert J. Nyzen, Munson Township, OH (US)

(73) Assignee: Argo-Tech Corporation, Cleveland, OH (US)

( * ) Notice: Subject to any disclaimer, the term of this patent is extended or adjusted under 35 U.S.C. 154(b) by 36 days.

(21) Appl. No.: 09/882,858

(22) Filed: Jun. 15, 2001

(65) Prior Publication Data
US 2001/0054290 A1 Dec. 27, 2001

Related U.S. Application Data
(60) Provisional application No. 60/211,591, filed on Jun. 15, 2000.

(51) Int. Cl.[7] .................................................. F02C 9/26
(52) U.S. Cl. ................................................... 60/39.281
(58) Field of Search .............................. 60/39.281, 746, 60/747

(56) References Cited
U.S. PATENT DOCUMENTS

| | | | | |
|---|---|---|---|---|
| 2,770,945 A | | 11/1956 | Crim | |
| 3,334,705 A | | 8/1967 | Lam | |
| 3,908,360 A | * | 9/1975 | Meyer et al. | 60/39.281 |
| 3,946,551 A | * | 3/1976 | Linebrink et al. | 60/39.281 |
| 4,057,073 A | | 11/1977 | Adams | |
| 4,208,871 A | * | 6/1980 | Riple | 60/39.281 |
| 4,541,451 A | | 9/1985 | Wittren et al. | |
| 4,760,696 A | | 8/1988 | Rooks et al. | |
| 4,910,956 A | | 3/1990 | Legore et al. | |
| 5,116,362 A | | 5/1992 | Arline et al. | |
| 5,235,806 A | | 8/1993 | Pickard | |
| 5,339,636 A | | 8/1994 | Donnelly et al. | |
| 5,402,634 A | * | 4/1995 | Marshall | 60/747 |
| 5,709,079 A | | 1/1998 | Smith | |
| 5,896,737 A | | 4/1999 | Dyer | |

* cited by examiner

Primary Examiner—Louis J. Casaregola
(74) Attorney, Agent, or Firm—Fay, Sharpe, Fagan, Minnich & McKee, LLP

(57) ABSTRACT

A fuel system for providing a desired fuel flow to an engine comprises a metering assembly for providing a variable portion of metered fuel flow to an associated nozzle system. The variable portion corresponds to a variable demand signal received by the metering assembly. A centrifugal pumping assembly is adapted to receive fuel from an associated pumping system. The centrifugal pumping assembly is capable of pressurizing and delivering adequate fuel flow to the metering assembly. A throttling valve is in fluid communication between the metering assembly and the centrifugal pumping assembly to maintain a constant pressure rise across the metering assembly. An electronic engine control provides the variable demand signal to the metering assembly.

10 Claims, 1 Drawing Sheet

LOW-COST GENERAL AVIATION FUEL CONTROL SYSTEM

This application claims the benefit of and hereby expressly incorporates by reference U.S. Provisional Application Serial No. 60/211,591, filed on Jun. 15, 2000.

BACKGROUND OF THE INVENTION

1. Field of the Invention

The present invention relates to aircraft fueling systems, and more particularly, to an improved low-cost general aviation fuel control system, and will be described with particular reference thereto. However, it will be appreciated that the present invention is also amenable to other like applications.

2. Discussion of the Art

Fuel delivery systems for aircraft gas turbine engines often use a fixed, positive displacement pump to pressurize fuel from the aircraft fuel tank(s). Such a pump is generally engine driven and, as a result, provides a volumetric flow that is a function of the speed of the engine driving the pump. Thus, the positive displacement pump of an aircraft fuel system is generally sized to ensure sufficient flow capacity during all possible operating conditions.

In order to deliver accurately measured fuel flow to the aircraft engine, the pressurized fuel exiting the positive displacement pump is regulated or metered in some manner. Heretofore, metering and fuel delivery to the aircraft engine were generally accomplished by using a gearbox between the aircraft engine and the positive displacement pump and a set of valves, such as a bypass valve and a metering valve.

The use of a gearbox and multiple valves for metering and delivering fuel flow to the aircraft engine is problematic because such devices adversely impact on space constraints and increase the overall weight of the aircraft. Further, fuel systems employing these devices are often costly to manufacture and maintain.

Additionally, these types of fuel systems often require heat exchangers to keep the fuel from freezing. The necessity of heat exchangers is detrimental because these devices further increase the volume, weight, and cost of the fueling system.

The present invention provides an improved fuel system for minimizing the above-referenced and other disadvantages of the prior art.

BRIEF SUMMARY OF THE INVENTION

In accordance with one aspect of the present invention, a fuel system for providing a desired fuel flow to an engine is provided. The fuel system includes a metering assembly for providing a variable portion of metered fuel flow to an associated nozzle system. The variable portion corresponds to a variable demand signal received by the metering assembly. A centrifugal pumping assembly receives fuel from an associated pumping system. The centrifugal pumping assembly pressurizes and delivers adequate fuel flow to the metering assembly. A throttling valve is in fluid communication between the metering assembly and the centrifugal pumping assembly to maintain a constant pressure rise across the metering assembly. An electronic engine control provides the variable demand signal to the metering assembly.

In accordance with another aspect of the present invention, a throttled pumping apparatus is provided for delivering pressurized fuel to an associated metering pump apparatus to maintain a consistent pressure differential across the associated metering pump apparatus. The throttled pumping apparatus preferably includes an engine shaft driven centrifugal pump and a throttling valve. The engine shaft driven centrifugal pump pressurizes and delivers a fuel output. The throttling valve reduces the fuel output before the fuel enters the associated metering pump to maintain a consistent pressure rise across the associated metering pump apparatus.

In accordance with yet another aspect of the present invention, a method of providing a desired fuel flow to an aircraft engine is provided. The method includes the steps of pressurizing adequate fuel flow, metering a variable portion of the pressurized fuel flow for delivery to the aircraft engine, and throttling the pressurized fuel flow prior to metering.

One advantage of the present invention is that it uses a simplistic design to reduce the volume and weight of an aircraft fuel system.

Another advantage of the present invention is that it uses a minimum number of parts.

Yet another advantage of the present invention is that the overall fuel system manufacturing costs are relatively low.

Still further advantages and benefits of the present invention will become apparent to those of ordinary skill in the art upon reading and understanding the following detailed description of the preferred embodiments.

BRIEF DESCRIPTION OF THE DRAWINGS

The structure, operation and advantages of the presently preferred embodiment of this invention will become further apparent upon consideration of the following description, taken in conjunction with the accompanying drawings. Of course, the drawings are only for purposes of illustrating preferred embodiments and are not to be construed as limiting the invention.

DETAILED DESCRIPTION OF THE INVENTION

Figure 1:
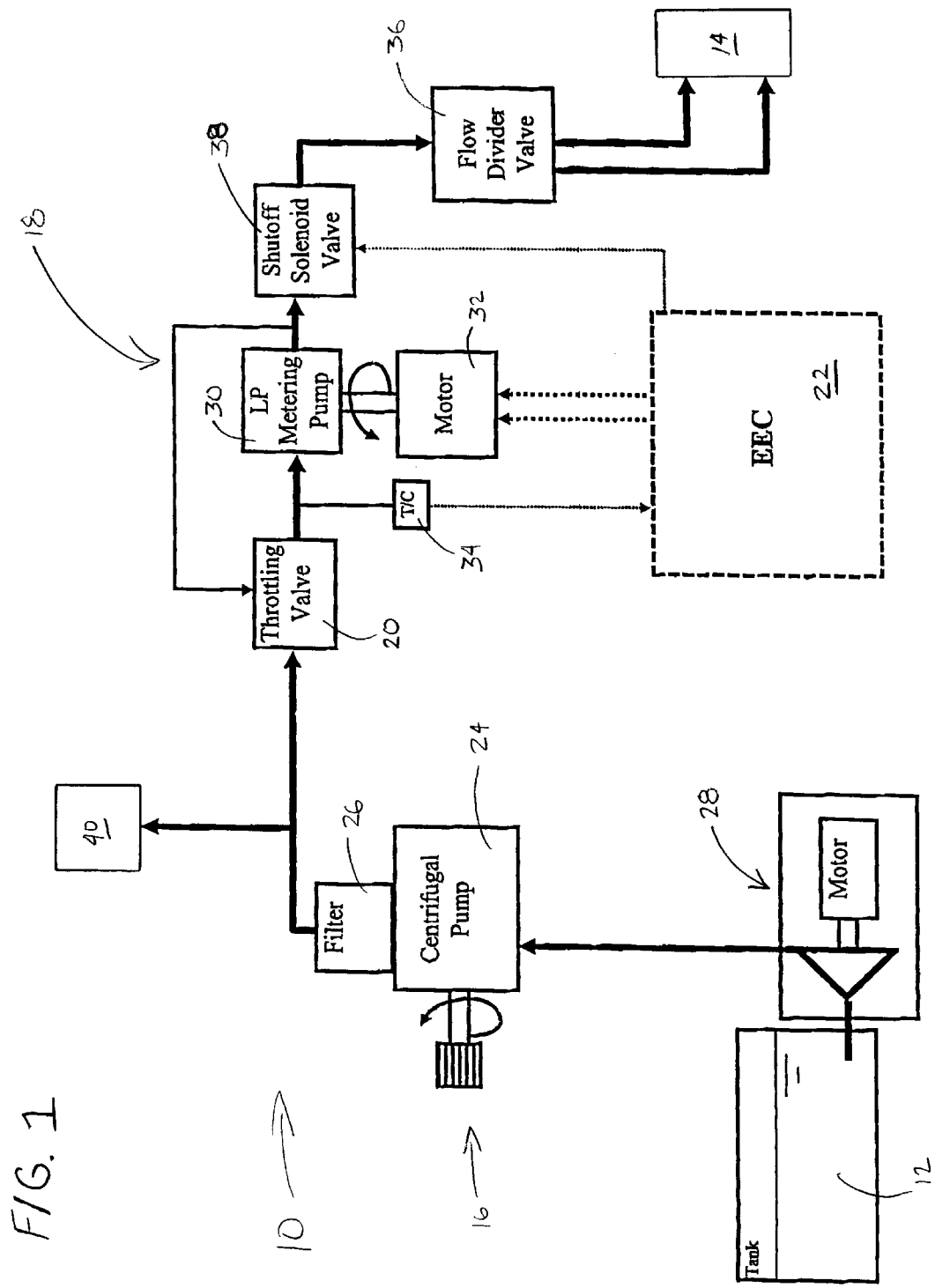
FIG. 1 is a diagrammatic view of a preferred aircraft fuel system in accordance with the present invention.

With reference to FIG. 1, an aircraft fuel control system 10 is provided to reliably control the rate of fuel transferred from fuel tanks 12 to an aircraft nozzle system 14 where the fuel is combusted/burned to produce thrust necessary for all flight requirements. The fuel control system 10 includes a centrifugal pumping assembly 16, a fuel metering assembly 18, a throttling valve 20, and an electronic engine control (EEC) 22.

The centrifugal pumping assembly 16 is preferably an engine shaft-driven pump 24 for pressurizing and delivering adequate fuel flow to the metering assembly 18. More particularly, the engine shaft-driven pump 24 is capable of delivering the maximum pressure and flow required by the engine application. A filter 26 is provided downstream for filtering the pressurized fuel from the shaft-driven pump 24 prior to delivery to the metering assembly 18. As will also be appreciated, the pump 24 receives the fuel from an upstream boost pumping system 28 schematically represented in FIG. 1.

The preferred engine shaft-driven pump 24 is a single impeller having a single pumping stage. The impeller is supported in a housing via fuel-lubricated bearings. A seal is provided to prevent fuel leakage from the housing. Of course, other pumping means or pump structures can be used and are to be considered within the scope of the present invention. For example, an electrically driven pump may be used instead of the engine-driven pump 24.

The metering assembly 18 preferably incorporates an electric motor-driven metering pump 30 for providing a variable portion of metered fuel flow to the aircraft nozzle system 14. The illustrated arrangement of the metering pump is driven by a brushless DC motor 32 to supply metered fuel to an engine combustor. The metering pump 30 receives filtered fuel from the centrifugal pumping assembly 16 and delivers a variable portion of that fuel to the nozzle system 14 in response to a variable demand signal from the EEC 22. Additionally, the metering assembly 18 provides adequately pressurized fuel to the nozzle system 14 during low speed engine starting, i.e., 10% to 20% of normal engine operating speed. At these low speeds, the pressure delivered by the centrifugal pumping assembly 16 is insufficient for the system. As a result, the metering pump assembly 18 provides the system needs during this low speed operation.

The throttling valve 20 maintains a constant pressure rise across the metering assembly 18. More specifically, the throttling valve 20 appropriately reduces the fuel pressure received by the metering assembly 18 from the centrifugal pump 24, thereby maintaining a constant pressure rise of, for example, one hundred pounds per square inch differential across the metering assembly 18. A constant pressure rise across the metering assembly 18 results in consistently accurate metering of fuel flow.

The variable demand signal, representative of an amount of fuel flow to be delivered to the nozzle system 14, is generated by the EEC 22. More particularly, the EEC 22 receives an input power source and a plurality of input command signals from the aircraft. The input command signals include, for example, general engine flow demand data and a fuel temperature reading obtained by a fuel temperature probe 34. The fuel temperature probe 34 allows the metering assembly 18 to deliver accurate and expected fuel flow over a range of varying temperatures. The EEC 22 uses the input power source, input command signals, and temperature data to generate an appropriate variable demand signal. This signal is sent to the DC motor 32 to adjust or maintain the metering pump speed thereby delivering accurate fuel flow to the aircraft nozzle system 14 over a range of varying temperatures.

The metered fuel flows from the metering pump 30 to a fuel flow divider valve 36. The flow divider valve 36 regulates flow between a primary fuel nozzle circuit and a secondary fuel nozzle circuit of the fuel nozzle system 14. More specifically, the flow divider 36 establishes a flow in the primary fuel nozzle circuit prior to establishing flow in the secondary nozzle circuit. The flow divider 36, however, will permit a small amount of flow to enter the secondary circuit to keep the secondary circuit filled with fuel at all times.

A shutoff solenoid valve 38 is preferably located between the metering pump 30 and the flow divider valve 36. The shutoff valve 38 moves between an open position and a closed position. In the open position fuel to flows generally unobstructed from the metering pump 30 to the divider valve 36. The closed position prevents fuel from flowing therethrough.

In operation, the upstream aircraft boost pumping system 28 delivers fuel to the centrifugal pumping assembly 16. The centrifugal pumping assembly 16 pressurizes the fuel. The degree of pressurization depends primarily on the engine operating speed because the centrifugal pump 24 is engine shaft driven. The pressurized fuel is filtered as it exits the centrifugal pump 26. The pressurized and filtered flow is then jointly delivered for use in an aircraft motive flow system 40 and for consumption by the aircraft engine. The flow delivered to the aircraft engine for consumption is directed through the metering assembly 18.

The metering assembly 18 delivers fuel flow to the engine fuel nozzle system 14 in response to a fuel flow variable demand signal from the EEC 22. The variable demand signal is generated by the EEC using the input power source and the input command signals. Thus, an electrical control signal from the aircraft corresponding to thrust is used to servo the speed of the low pressure positive displacement metering pump 30 while accounting for variances in fuel temperature. Distribution of fuel from the metering assembly 18 to the primary and secondary fuel nozzles of the nozzle system 14 is proportioned by the flow divider 36.

Engine shut-off is accomplished through either of two means. The first shut-off means is to reduce the flow variable demand signal to zero causing the metering pump 30 to stop pumping fuel to the aircraft fuel nozzle system 14. The second means is to use the shut-off valve 38 between the metering assembly 18 and the flow divider 36. The shut-off solenoid valve can be moved to the closed position by a close signal generated from the EEC to prevent fuel flow from being delivered to the fuel nozzle system.

There are also two ways of achieving the aircraft fuel system ecology function, i.e., draining the fuel manifold upon engine shutdown. One way is to locate a drain port on the shut-off valve 38. Thus, when the shut-off valve 38 is in the closed position, the drain port is opened to remove fuel from the fuel system 10. A second way is to evacuate or pump out fuel from the manifold during engine shutdown. Evacuating fuel from the manifold may be accomplished by operating the metering pump 30 in reverse. The metering pump 30 will force fuel from the aircraft engine back into the fuel tanks 12.

Notably, the new fuel system of the present invention does not use a fuel/oil heat exchanger. The use of the engine driven centrifugal pump 24 heats the fuel sufficiently to avoid icing conditions within the fuel.

In summary, a new fuel control system is envisioned, particularly for low-cost general aviation applications. A system design approach integrates a high speed pump, fluid metering element, and electronic engine control to use fluid pumping, fluid metering, and electro-mechanical energy conversion in a unique system for a given application. The EEC is responsible for controlling engine functions, receiving inputs from the airframe and engine to determine the appropriate schedule of engine parameters (including metered fuel flow). Preferably, the EEC is a dual channel device and configured in a redundant fashion with internal monitoring capabilities to permit automatic switching between channels. Moreover, components in the system can also be dual element to ensure system redundancy in the most likely failure modes.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the invention, it is now claimed:

1. A fuel system for providing a desired fuel flow to an engine, comprising:

a metering assembly for providing a variable portion of metered fuel flow to an associated nozzle system, the variable portion corresponding to a variable demand signal received by the metering assembly;

a centrifugal pumping assembly adapted to receive fuel from an associated pumping system, the centrifugal pumping assembly capable of pressurizing and delivering adequate fuel flow to the metering assembly;

a throttling valve in fluid communication between the metering assembly and the centrifugal pumping assembly to maintain a constant pressure rise across the metering assembly;

an electronic engine control for providing the variable demand signal to the metering assembly; and a fuel temperature probe for providing internal fuel temperature feedback to the electronic engine control to improve the accuracy of metered flow delivered to the associated nozzle system.

2. The fuel system of claim 1 wherein the centrifugal pumping assembly includes a shaft-driven centrifugal pump.

3. The fuel system of claim 2 wherein the centrifugal pump is driven directly by the engine shaft at high speeds.

4. The fuel system of claim 1 wherein the metering assembly includes a low-pressure, variable speed pump.

5. The fuel system of claim 4 wherein the variable speed pump is electrically powered.

6. The fuel system of claim 1 wherein the metering assembly includes an electric motor and a positive displacement metering pump driven by the electric motor for metering flow to the associated nozzle system.

7. The fuel system of claim 1 wherein the metering assembly includes a flow divider for selectively proportioning fuel flow to a primary nozzle and a secondary nozzle of the associated nozzle system.

8. The fuel system of claim 1 wherein the metering assembly includes a means for preventing fuel flow to the associated nozzle system.

9. The fuel system of claim 1 wherein the metering assembly provides system pressures and flows during engine starting.

10. The fuel system of claim 1 wherein the variable demand signal of the electronic engine control varies depending upon input command signals and an input power source received by the electronic engine control.

* * * * *